(12) United States Patent
Chen et al.

(10) Patent No.: US 10,773,342 B2
(45) Date of Patent: Sep. 15, 2020

(54) 3D PRINTING DEVICE AND OPERATION METHOD THEREOF

(71) Applicant: Tongtai Machine & Tool Co., Ltd., Kaohsiung (TW)

(72) Inventors: Hsin-Pao Chen, Kaohsiung (TW); Jui-Hsiung Yen, Kaohsiung (TW)

(73) Assignee: Tongtai Machine & Tool Co., Ltd., Kaohsiung (TW)

( * ) Notice: Subject to any disclaimer, the term of this patent is extended or adjusted under 35 U.S.C. 154(b) by 359 days.

(21) Appl. No.: 15/855,101

(22) Filed: Dec. 27, 2017

(65) Prior Publication Data
US 2019/0091805 A1 Mar. 28, 2019

(30) Foreign Application Priority Data
Sep. 27, 2017 (CN) .......................... 2017 1 0888851

(51) Int. Cl.
*B23K 26/342* (2014.01)
*B33Y 10/00* (2015.01)
(Continued)

(52) U.S. Cl.
CPC ........ *B23K 26/342* (2015.10); *B23K 26/0093* (2013.01); *B23K 26/02* (2013.01); *B23K 26/0604* (2013.01); *B23K 26/0823* (2013.01); *B23K 26/14* (2013.01); *B23K 26/144* (2015.10); *B23K 26/147* (2013.01); *B33Y 10/00* (2014.12); *B33Y 30/00* (2014.12); *B33Y 40/00* (2014.12)

(58) Field of Classification Search
CPC ......... B33Y 10/00; B33Y 30/00; B33Y 40/00; B33Y 50/02; B29C 64/393; B29C 64/245; B29C 64/364; B29C 64/357; B29C 64/214; B29C 64/00; B29C 64/153; B29C 64/241; B29C 64/268; B29C 64/321; B29C 64/20; B29C 64/209; B23K 26/342; B23K 26/14; B23K 26/147; B23K 26/0604; B23K 26/0823; B23K 26/0093; B23K 26/02; B23K 26/144; B23K 26/34; B22F 7/00; B22F 3/105; B23P 23/04; C23C 24/10; C23C 28/00; C23C 4/12; C22C 38/54; C25D 15/00

See application file for complete search history.

(56) References Cited

U.S. PATENT DOCUMENTS 5,855,149 A * 1/1999 Islam ..................... B23K 26/34
76/107.8
6,269,540 B1 * 8/2001 Islam ................. B23K 26/0604
29/889.7
(Continued)

FOREIGN PATENT DOCUMENTS

CN 103343341 A 10/2013
CN 104126075 A 10/2014
(Continued)

*Primary Examiner* — Patrick M. Buechner

(57) ABSTRACT

A rolling type 3D printing device for recycling powders and an operation method thereof are provided. The rolling type 3D printing device has a rolling mechanism, at least one optical module, and a powder conveying module. The rolling mechanism holds a workpiece and receives powders. Cylindrical or cone workpieces can be laminated by the rolling type 3D printing device through the design of the rolling mechanism.

10 Claims, 6 Drawing Sheets

(51) Int. Cl.
*B33Y 30/00* (2015.01)
*B23K 26/144* (2014.01)
*B23K 26/02* (2014.01)
*B23K 26/00* (2014.01)
*B23K 26/08* (2014.01)
*B33Y 40/00* (2020.01)
*B23K 26/06* (2014.01)
*B23K 26/14* (2014.01)

(56) References Cited

U.S. PATENT DOCUMENTS

| | | | | |
|---|---|---|---|---|
| 10,183,318 B2* | 1/2019 | Boegli | ............... | B21B 27/005 |
| 10,500,832 B2* | 12/2019 | Bogdan, Jr. | ............... | B29C 64/153 |
| 2006/0118532 A1* | 6/2006 | Chung | ............... | B22F 3/1028 |
| | | | | 219/121.85 |
| 2006/0214335 A1* | 9/2006 | Cox | ............... | B01F 3/188 |
| | | | | 264/497 |
| 2010/0044547 A1* | 2/2010 | Higashi | ............... | B22F 3/003 |
| | | | | 249/79 |
| 2014/0265049 A1* | 9/2014 | Burris | ............... | B23K 26/034 |
| | | | | 264/497 |
| 2015/0017001 A1 | 1/2015 | Ahn | | |
| 2016/0136731 A1* | 5/2016 | McMurtry | ............... | B22F 3/1055 |
| | | | | 419/53 |
| 2017/0028631 A1* | 2/2017 | Hyatt | ............... | B05B 7/1468 |
| 2018/0186082 A1* | 7/2018 | Randhawa | ............... | B29C 64/135 |

FOREIGN PATENT DOCUMENTS

| | | |
|---|---|---|
| CN | 105619083 A | 6/2016 |
| CN | 106676514 A | 5/2017 |
| CN | 106964776 A | 7/2017 |
| CN | 107052340 A | 8/2017 |
| DE | 102009043594 A1 | 3/2011 |

* cited by examiner

US 10,773,342 B2

3D PRINTING DEVICE AND OPERATION METHOD THEREOF

FIELD OF INVENTION

The present disclosure relates to a 3D printing device and an operation method thereof, and in particular to a rolling type 3D printing device and an operation method thereof.

BACKGROUND OF INVENTION

In laminating manufacturing technology, data and material are put into a 3D printing device. The workpiece is stacked in the layers so that the complex structure of the workpiece can be completed. The technology of 3D printing device includes selective laser sintering (SLS), selective laser melting (SLM), direct metal laser sintering (DMLS), and electron beam melting (EBM). In SLS, low temperature melting polymer powders are fused by using a low-power laser. In SLM, metal powders are melted by using a high-energy laser. In DMLS, metal powders are fused into a solid part by melting it locally using a focused laser beam. In EBM, metal powders are melted by using an electron beam.

However, in traditional laminating manufacturing technology, the process of feeding powders, flattening powders, feeding and inhaling gas, and melting by lasers are limited by the working range of an f-theta lens. Only one plane is laminated to form a workpiece, and cylindrical or cone workpieces cannot be laminated through the traditional laminating manufacturing technology. In addition, gas is inhaled or fed onto the layers and cannot effectively provide the powders recovery for a long time. The working range is limited by a flowing distance and wind speed of a gas field.

As a result, it is necessary to provide an improved a rolling type 3D printing device and an operation method thereof to solve the problems existing in the conventional technologies, as described above.

SUMMARY OF INVENTION

An object of the present disclosure is to provide a rolling type 3D printing device and an operation method thereof, wherein a laminated manufacture of a cylindrical or cone workpiece is processed through the design of a rolling mechanism so that the cylindrical or cone workpiece can be laminated by the powders of a predetermined material in a designated area, and the thickness and predetermined size of the workpiece can be generated.

To achieve the above objects, the present disclosure provides a rolling type 3D printing device. The rolling type 3D printing device comprises a rolling mechanism, at least one optical module, and a powder conveying module. The rolling mechanism is configured to hold a workpiece, receive powders, and drive the workpiece to rotate along an axis. The optical module includes laser sources which is disposed above the rolling mechanism and configured to emit lasers to the powders. The powder conveying module includes at least one powder channel, at least one powder channel opening, two gas channels, and two gas channel openings, wherein the powder channel is disposed above the rolling mechanism; the powder channel opening is formed on an outputting end of the powder channel and configured to dispense the powders to the workpiece; the gas channels are disposed above the rolling mechanism; the gas channel openings are separately formed on a first end of the gas channels, and located at two sides of the lasers, respectively. One of the gas channel openings is configured to feed a gas above the workpiece, and the other of the gas channel openings is configured to inhale the gas and unwanted powders generated by using the lasers to melt the powders on the workpiece, wherein a gas flowing field is formed between the two gas channel openings.

In one embodiment of the present disclosure, the rolling mechanism comprises two rotary shafts assembled at two sides of the workpiece, respectively.

In one embodiment of the present disclosure, the rolling mechanism further comprises two dropping stands, the rotary shafts are disposed on the dropping stands, respectively, and the dropping stands are configured to drive the rotary shafts to move up or down, respectively.

In one embodiment of the present disclosure, the powder conveying module further comprises at least one scraper disposed on a surface of one of the gas channels and configured to touch the workpiece.

In one embodiment of the present disclosure, the rolling type 3D printing device further comprises a powder recovery tank, wherein the rolling mechanism is disposed within the powder recovery tank, and the workpiece is located at a top gap of the powder recovery tank.

In one embodiment of the present disclosure, the rolling type 3D printing device further comprises a material removal mechanism disposed at a side of the rolling mechanism, wherein the material removal mechanism includes a tool shaft configured to assemble tools to cut the workpiece.

In one embodiment of the present disclosure, the material removal mechanism further includes a horizontal movement base and a lifting base; the lifting base is configured to drive the horizontal movement base to move up or down, and the horizontal movement base is configured to drive the tool shaft to move along a plane.

To achieve the above objects, the present disclosure provides an operation method of a rolling type 3D printing device. The operation method comprises: a powder feeding step of feeding an amount of powders to at least one powder channel through at least one powder feeding tank so that the powders are dispensed to a surface of a workpiece through a powder channel opening; an adjusting step of adjusting a height of two sides of the workpiece, respectively through using two dropping stands of a rolling mechanism; a powder flattening step of driving two rotary shafts of the rolling mechanism to rotate the workpiece and flattening the powders on the workpiece by at least one scraper; a fusing step of moving laser sources so that lasers emitted by the laser sources melts the powders flattened on the workpiece for laminating the powders on the workpiece; a powder recycling step of inhaling unwanted powders generated by using the lasers to melt and laminate the powders on the workpiece through forming a gas flowing field defined between two gas channel openings located at two sides of the lasers when the lasers melt the powders on the workpiece; a removing step of controlling a moving position of a tool by using a material removal mechanism so that the tool is driven to cut the laminated powders on the surface of the workpiece; and a completion determining step of lowering a height of the two dropping stands of the rolling mechanism and determining whether the workpiece is completed, wherein the workpiece is moved out of the rolling type 3D printing device if the workpiece is completed, or the powder feeding step is re-executed if the workpiece is not completed.

In one embodiment of the present disclosure, the operation method further comprises a positioning step before the powder feeding step, and the positioning step is configured to move the two dropping stands of the rolling mechanism so that the workpiece is moved to a predetermined position.

In one embodiment of the present disclosure, in the removing step, the tool is moved up or down by a lifting base of the material removal mechanism, and moved along a plane by a horizontal movement base of the material removal mechanism; and wherein the tool is also rotated or vibrated along an axis by a tool shaft of the material removal mechanism to cut the laminated powders on the surface of the workpiece.

As described above, the rolling type 3D printing device of the present disclosure can provide a laminated manufacture of a cylindrical or cone workpiece so that the cylindrical or cone workpiece can be laminated by the powders of a predetermined material in a designated area, and the thickness and predetermined size of the workpiece can be generated. In addition, the rolling type 3D printing device can feed the powders, flatten the powders, melt the powders, and inhale the unwanted powders within the predetermined plane, and cannot be limited the limitation that the working range of f-theta lens is limited, and the workpiece must be flat to be laminated. Therefore, the rolling type 3D printing device can laminate a cylindrical or cone workpiece so that the work efficiency can be improved. A workpiece with an irregular surface, such as cylindrical or cone, can be laminated effectively, the speed limitation that the gas flowing field cannot inhale the unwanted powders for a long time can be reduced, and the lamination time of the workpiece can be reduced.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, etc., are only directions by referring to the accompanying drawings, and thus the used directional terms are used to describe and understand the present disclosure, but the present disclosure is not limited thereto.

Figure 1:
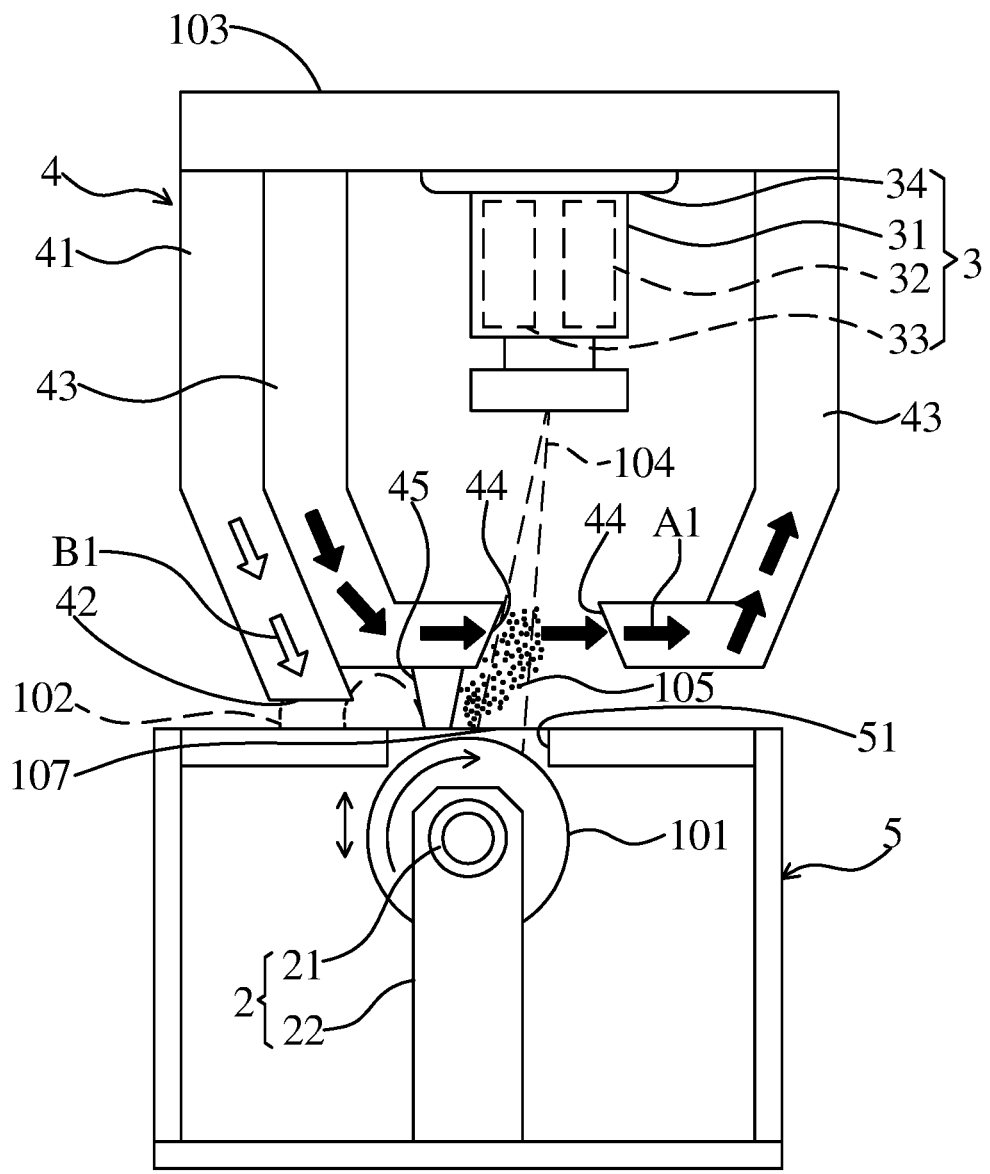
FIG. 1 is a side view of a rolling type 3D printing device according to a preferred embodiment of the present disclosure.
Figure 2:
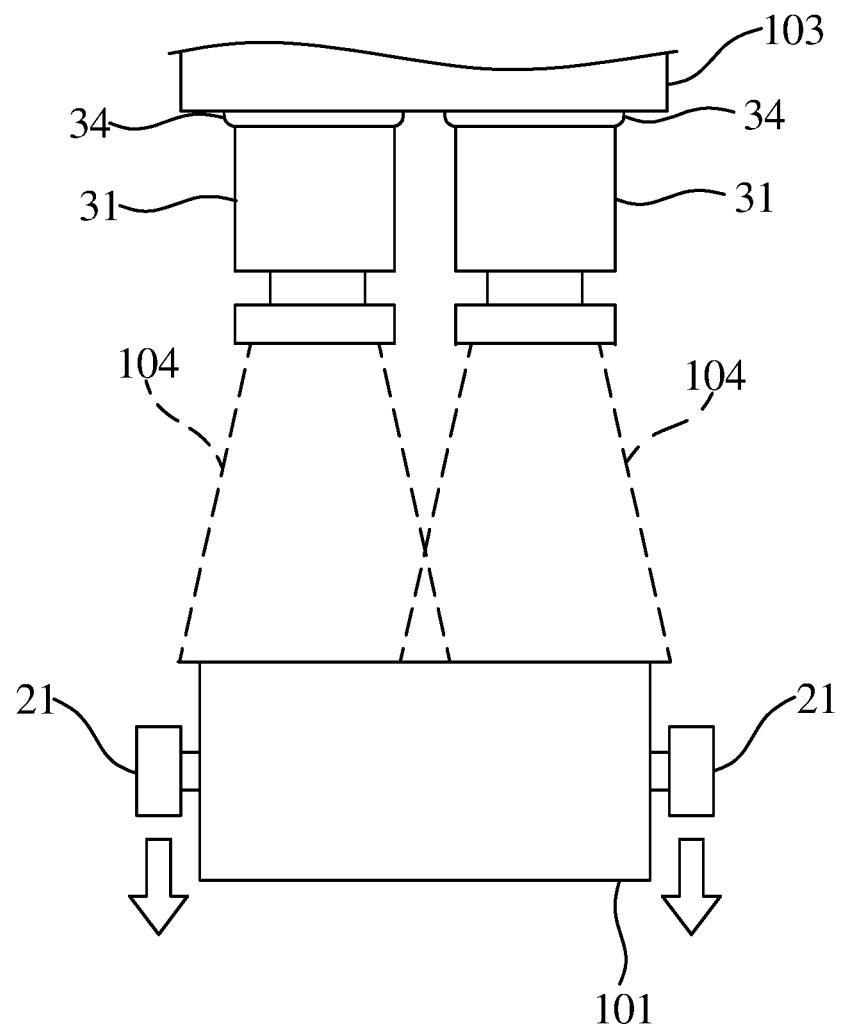
FIGS. 2 and 3 are schematic views of the rolling type 3D printing device according to the preferred embodiment of the present disclosure.
Figure 3:
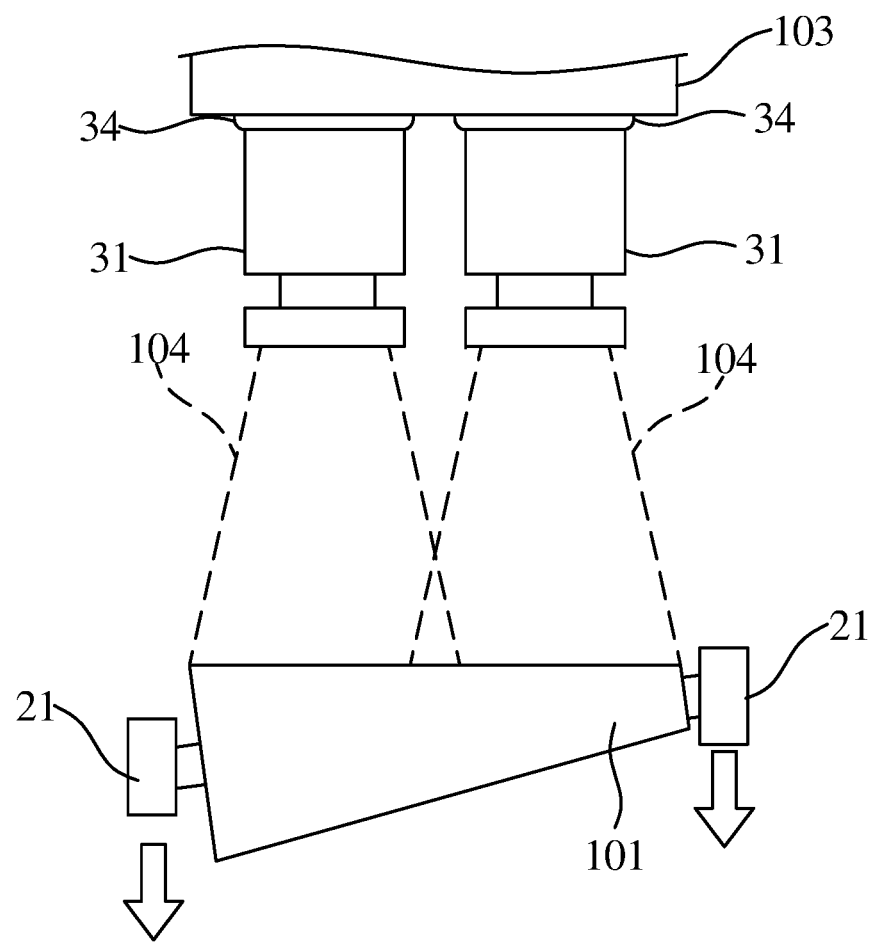

Referring to FIGS. 1-3, a perspective view of a rolling type 3D printing device according to a preferred embodiment of the present disclosure is provided, wherein rolling type 3D printing device comprises a rolling mechanism 2, at least one optical module 3, a powder conveying module 4, and a powder recovery tank 5. The detailed structure of each component, assembly relationships, and principle of operation in the present invention will be described in detail hereinafter.

Referring to FIGS. 1-3, the rolling mechanism 2 is configured to hold a workpiece 101, receive powders 102, and drive the workpiece 101 to horizontally rotate along a horizontal axis (such as parallel to the horizon), wherein the rolling mechanism 2 is disposed within the powder recovery tank 5, and the workpiece 101 is located at a top gap 51 of the powder recovery tank 5. In the preferred embodiment, the rolling mechanism 2 comprises two rotary shafts 21 and two dropping stands 22.

The two rotary shafts 21 are assembled at two sides of the workpiece 101, respectively. The two rotary shafts 21 are disposed on the dropping stands 22, respectively, and the dropping stands 22 are configured to drive the rotary shafts 21 to move up or down, respectively.

Referring to FIGS. 1-3, the optical module 3 is disposed on a top cover 103, located above the rolling mechanism 2, and configured to emit lasers 104 to the powders 102, wherein the optical module 3 includes laser sources 31, at least one coaxial sensor component 32, at least one galvanometer component 33, and a longitudinal adjusting base 34. The laser sources 31 (such as fiber laser or semiconductor laser) is configured to emit lasers 104 to the powders 102 on the workpiece 101 so that the powders are heated, melted, and solidified to laminate on a surface of the workpiece 101. The coaxial sensor component 32 is assembled on the laser sources 31 and configured to optically sense the workpiece 101 with sensing components, such as thermometer, thermal imager, charge coupled device (CCD), and photo diode, for obtaining a coaxial visual image. The galvanometer component 33 is assembled on the laser sources 31 and configured to scan the lasers generated by the laser sources 31. The longitudinal adjusting base 34 is disposed on the vertical and horizontal movement mechanism 6 and configured to assemble on the top cover 103 and adjust the laser sources 31 to move up or to move down slightly along a longitudinal direction.

Referring to FIGS. 1-3, the powder conveying module 4 includes at least one powder channel 41, at least one powder channel opening 42, two gas channels 43, two gas channel openings 44, and at least one scraper 46. The powder channel 41 is disposed above the rolling mechanism 2. The powder channel opening 42 is formed on an outputting end of the powder channel 41 and configured to dispense the powders 102 to the workpiece 101 (as shown by arrow B1 in FIG. 1). The gas channels 43 are disposed above the rolling mechanism 2. The two gas channel openings 44 are separately formed on an end of the gas channels 43, located at two sides of the lasers 104, respectively, wherein one of the gas channel openings 44 is configured to feed a gas above the workpiece 101, and the other of the gas channel openings 44 is configured to inhale the gas and unwanted powders 105 for recirculate use generated by using the lasers 104 to melt the powders 102 on the workpiece 101. A gas flowing field is formed between the two gas channel openings 44 (as shown by arrow A1). The powder channel 41 is adjoined to one of the gas channels 43, and one of the gas channel openings 44 configured to feed the gas and the powder channel opening 42 are located at the same side of the lasers 104. The scraper 45 is disposed on a surface of one of the gas channels 43 and configured to touch the workpiece 101. In the preferred embodiment, the powder channel opening 42 is located at a side of the top gap 51 of the powder recovery tank 5. The two gas channel openings 44 are located above the top gap 51. The optical module 3 includes two laser sources 31 (as shown in FIGS. 2 and 3), and the laser sources 31 are arranged along a distribution direction, and each of the directions of the lasers 104 generated by the laser sources 31 and a direction of a gas flowing field (as shown by arrow A1) are orthogonal to each other or commonly define an included angle greater than 45°.

According to the described structure, two dropping stands 22 can be driven to move the workpiece 101 to position and return to a position. An amount of powders 102 can be fed to at least one powder channel 41 through at least one powder feeding tank (not shown) so that the powders 102 are dispensed to a surface of the workpiece 101 through the powder channel opening 42. A height of two sides of the workpiece 101 are adjusted by driving the two dropping stands 22 of the rolling mechanism 2 so that the two sides of the workpiece 101 can be moved up/down at the same distance (as shown in FIG. 2) or at different distance (as shown in FIG. 3). The workpiece 101 is horizontally rotated along a horizontal axis by driving the two rotary shafts 21 of the rolling mechanism 2 so that the scraper 45 flattens the powders 102 on the workpiece 101 and flattens to a side of a cylindrical or cone workpiece 101. The cylindrical or cone workpiece 101 held by the rolling mechanism 2 can be rotated through computer or numerical controller, and the scraper 45 can flatten the powder 102 by rotating the workpiece 101. The laser sources 31 are driven to move the lasers 104 to melt the powders 102 on the workpiece 101 to a melt pool 107 (as shown FIGS. 1 and 4) so that the powders 102 are laminated on the surface of the workpiece 101. When the lasers 104 melt the powders 102, the gas flowing field formed between the two gas channel openings 44 located at two sides of the lasers 104 are used to inhale the gas and unwanted powders 105 generated by using the lasers 104 to melt the powders 102 on the workpiece 101. Finally, the two dropping stands 22 of the rolling mechanism 2 are lowered a height to determine whether the workpiece 101 is completed, wherein the workpiece 101 is removed if the workpiece is completed, or the powder feeding step is re-executed if the workpiece is not completed until the cylindrical or cone workpiece 101 is completed by program.

As described above, the rolling type 3D printing device of the present disclosure can provide a laminated manufacture of a cylindrical or cone workpiece 101. Laser sources 31 is disposed within a predetermined plane and configured to emit energy to the surface of the cylindrical or cone workpiece 101. The powders 102 can be fed by the powder conveying module 4 to process the laminated manufacture so that the cylindrical or cone workpiece 101 can be laminated by the powders 102 of a predetermined material in a designated area, and the thickness and predetermined size of the workpiece 101 can be generated (as shown in FIGS. 2 and 3). In addition, the rolling type 3D printing device can feed the powders, flatten the powders, melt the powders, and inhale the unwanted powders within the predetermined plane, and cannot be limited by the limitation that the working range of f-theta lens is limited, and the workpiece must be flat to be laminated. Therefore, the rolling type 3D printing device can laminate the cylindrical or cone workpiece 101 so that the work efficiency can be improved. The workpiece 101 with an irregular surface, such as cylindrical or cone, can be laminated effectively, the speed limitation that the gas flowing field cannot inhale the unwanted powders 105 for a long time can be reduced, and the lamination time of the workpiece 101 can be reduced.

Figure 4:
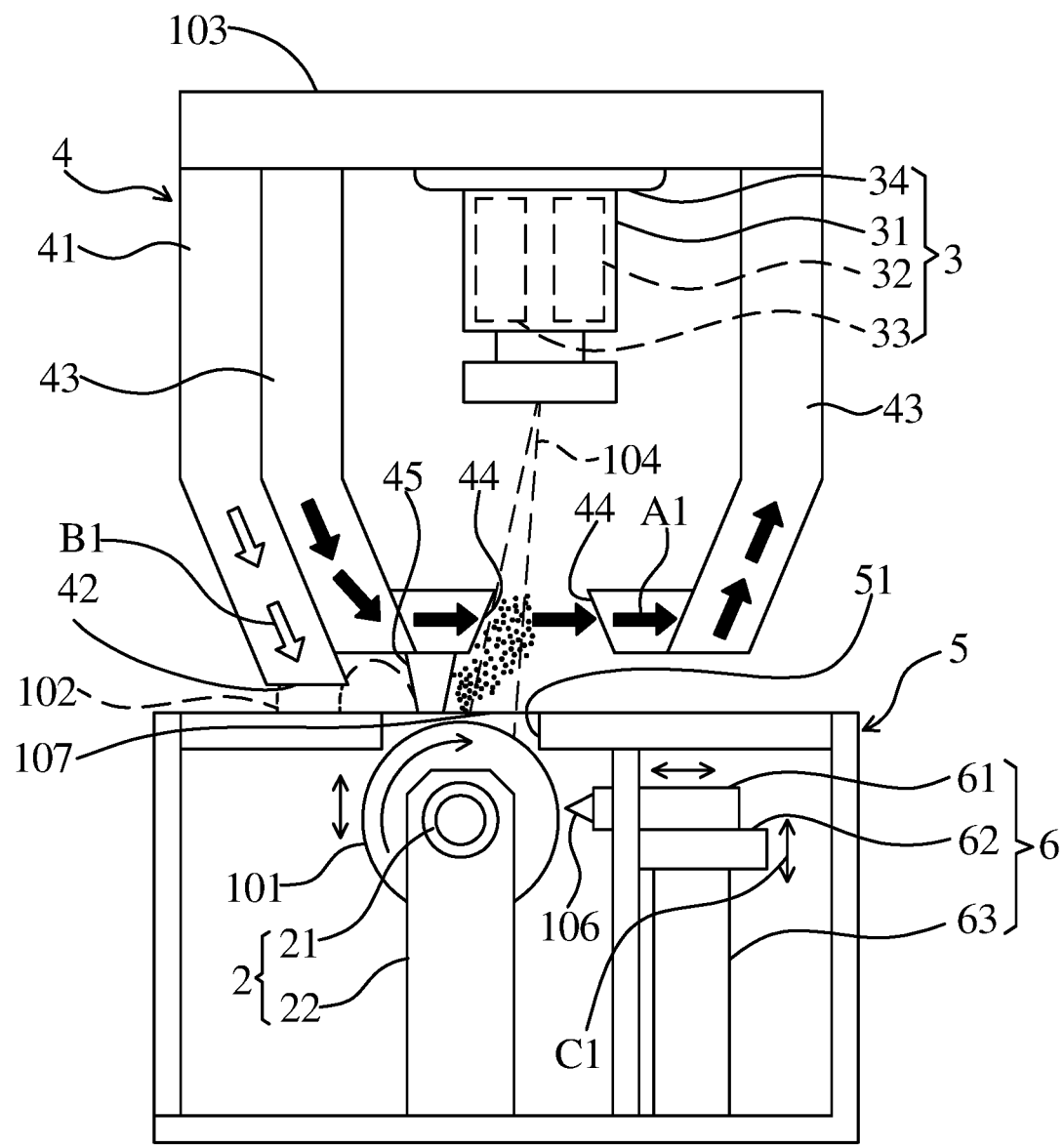
FIG. 4 is a side view of a rolling type 3D printing device according to another preferred embodiment of the present disclosure.
Figure 5:
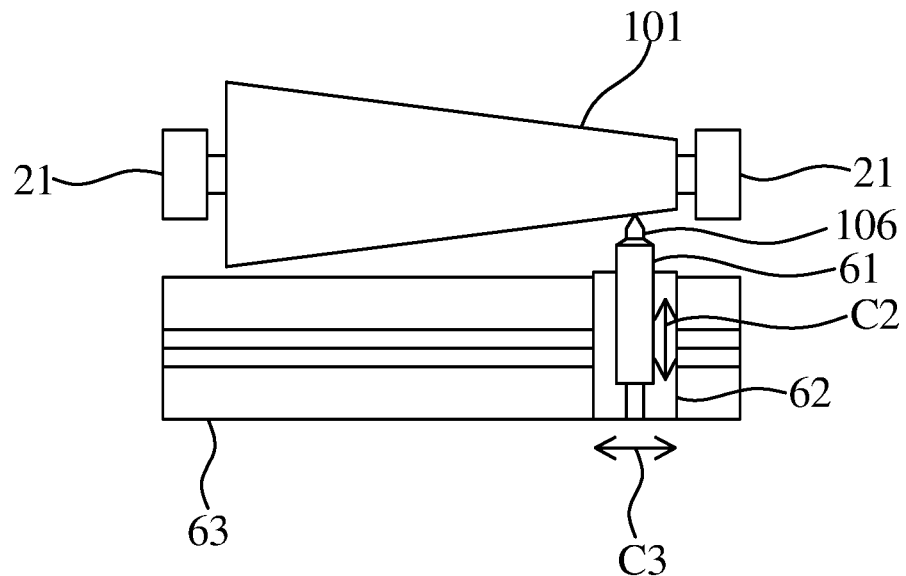
FIGS. 5 and 6 are schematic views of the rolling type 3D printing device according to another preferred embodiment of the present disclosure.
Figure 6:
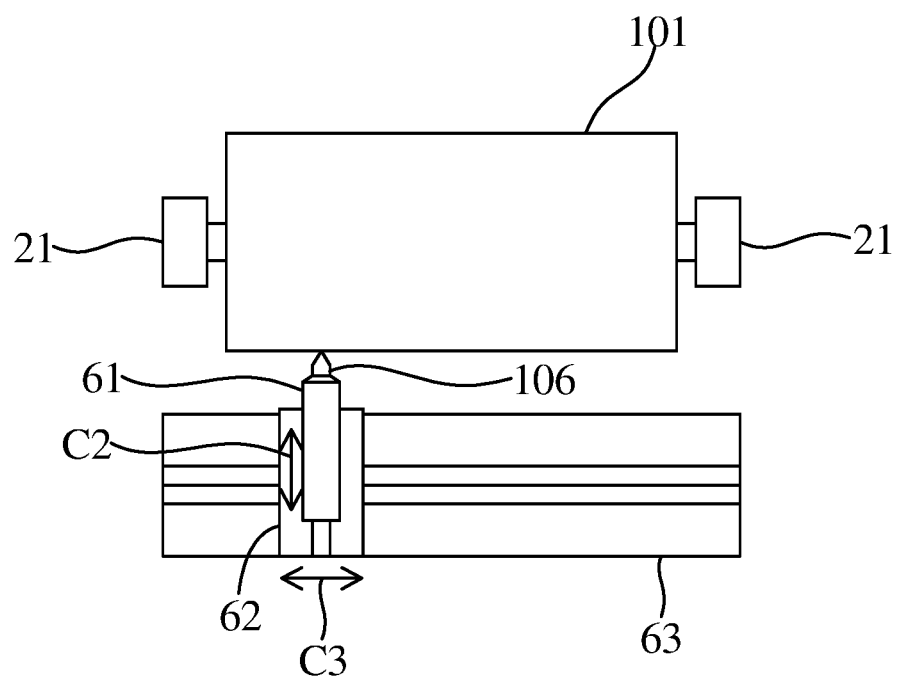

Referring to FIGS. 4 to 6, a rolling type 3D printing device according to another embodiment of the present disclosure is provided, and is similar to the first embodiment, so that the embodiment uses terms or numerals similar to those of the first embodiment. As shown, the difference of the embodiment is that the rolling type 3D printing device further comprises a material removal mechanism 6, wherein the material removal mechanism 6 is disposed at a side of the rolling mechanism 2. The material removal mechanism 6 includes a tool shaft 61, a horizontal movement base 62, and a lifting base 63, wherein the tool shaft 61 is configured to assemble tools 106 to cut the workpiece 101. The lifting base 63 is configured to drive the horizontal movement base 62 to move up/down vertically (as shown by arrow C1), and the horizontal movement base 62 is configured to drive the tool shaft 61 to move along a plane. In the embodiment, the tool shaft 61 can movably assemble on the horizontal movement base 62 to be moved longitudinally (as shown by arrow C2), and the horizontal movement base 62 can movably assemble on the lifting base 63 to be moved laterally (as shown by arrow C2).

According to the described structure, programmed by computer or numerical controller, the rolling type 3D printing device can control a movement position of the tools 106 by driving the material removal mechanism 6 so that the tools 106 cut material on the surface of the workpiece 101, wherein the cylindrical or cone workpiece 101 is processed through controlling the tool shaft 61 to move near the workpiece 101 so that the tools 106 touch the workpiece 101.

As described above, the rolling type 3D printing device can cut or laminate powders on the surface of the workpiece 101, wherein the laminated powders on the surface of the workpiece 101 are removed by the tools 106 so that the process time can be increased, and the quality of the workpiece process can be ensured.

Figure 7:
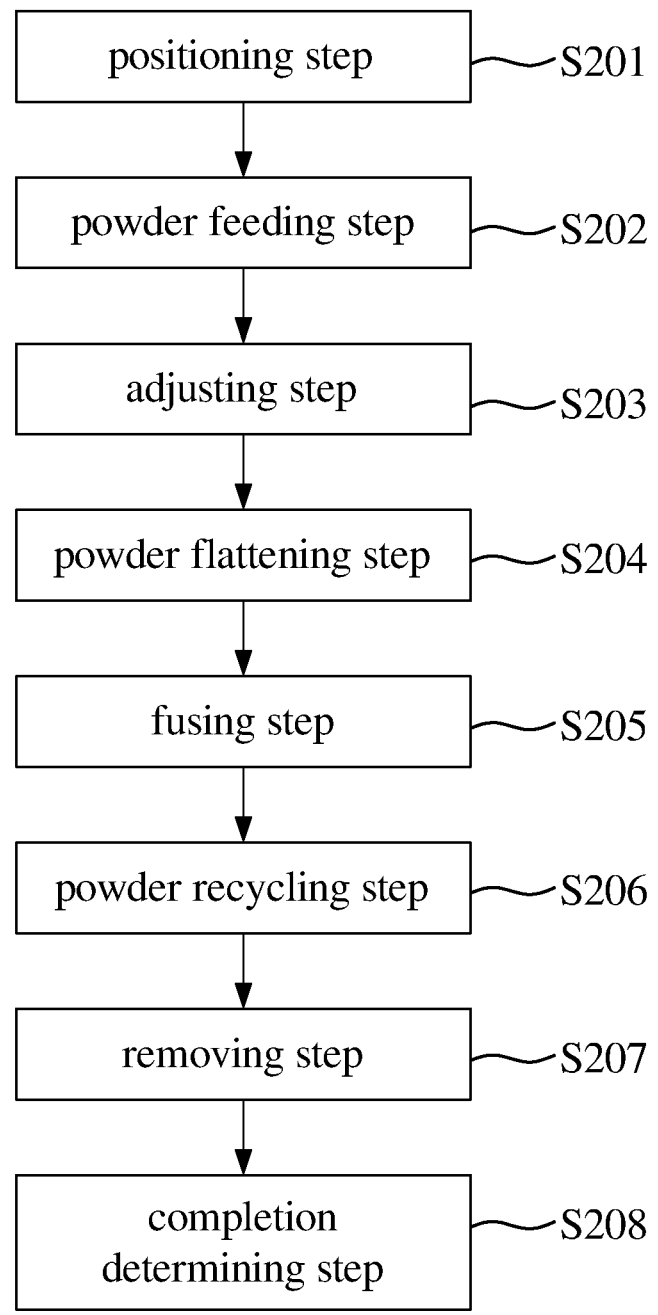
FIG. 7 is a flow chart of an operation method of the rolling type 3D printing device according to the preferred embodiment of the present disclosure.

Referring to FIG. 7 with reference to FIGS. 4 to 6, an operation method of rolling type 3D printing device according to a preferred embodiment of the present disclosure is provided, and operated by said rolling type 3D printing device. The operation method comprises a positioning step S201, a powder feeding step S202, an adjusting step S203, a powder flattening step S204, a fusing step S205, a powder recycling step S206, a removing step S207, and a completion determining step S208. The detailed steps and principles of operation in the present invention will be described in detail hereinafter.

Referring to FIG. 7 with reference to FIGS. 4 to 6, in the positioning step S201, commands are provided to control two dropping stands 22 of the rolling mechanism 2 to position and return to a position so that a workpiece 101 can be moved to a predetermined position.

Referring to FIG. 7 with reference to FIGS. 4 to 6, in the powder feeding step S202, an amount of powders 102 are fed to at least one powder channel 41 through at least one powder feeding tank (not shown) so that the powders 102 are dispensed to a surface of the workpiece 101 through a powder channel opening 42. In the embodiment, the powder feeding tank feed powders 102 by controlling valves or powder hoppers, and the type of the powders 102 can be chosen through the computer or numerical controller so that different types of the powders 102 can be fed.

Referring to FIG. 7 with reference to FIGS. 4 to 6, in the adjusting step S203, a height of two sides of the workpiece 101 are adjusted by driving the two dropping stands 22 of the rolling mechanism 2. In the embodiment, the dropping stands 22 are Z-axis dropping mechanisms, and the two sides of the workpiece 101 can be moved up/down vertically at the same distance (as shown in FIG. 2) or at different distance (as shown in FIG. 3).

Referring to FIG. 7 with reference to FIGS. 4 to 6, in the powder flattening step S204, the workpiece 101 is horizontally rotated along a horizontal axis by driving the two rotary shafts 21 of the rolling mechanism 2 so that at least one scraper 45 flattens the powders 102 on the workpiece 101. In the embodiment, the scraper 45 flattens to a side of a cylindrical or cone workpiece 101 by driving the dropping stands 22 to move up/down vertically, and the cylindrical or cone workpiece 101 held by the rolling mechanism 2 can be rotated through the computer or numerical controller, and the powders 102 can be flattened on the rotating workpiece 101 by the scraper 45.

Referring to FIG. 7 with reference to FIGS. 4 to 6, in the fusing step S205, the laser sources 31 are driven to move the lasers 104 to melt the powders 102 on the workpiece 101 so that the powders 102 are laminated on the surface of the workpiece 101. In the embodiment, after the above step of flattening the powders 102, the powders located at a specified position are fused through the computer or numerical controller to control the lasers 104, and the first layer of the workpiece 101 is melted with the powders to laminate on the surface of the workpiece 101.

Referring to FIG. 7 with reference to FIGS. 4 to 6, in the powder recycling step S206, when the lasers 104 melt the powders 102 on the workpiece 101, the gas flowing field formed between the two gas channel openings 42 located at two sides of the lasers 104 are used to inhale the gas and unwanted powders 105 generated by using the lasers 104 to melt the powders 102 on the workpiece 101. In the embodiment, the gas channel openings 42 correspond to each other, and one of the gas channel openings 42 inhales the gas and the other of the gas channel openings 44 feeds the gas. The gas of the gas flowing field is nitrogen ($N_2$) or inert gas, such as argon (Ar) and helium (He). The flow between the two gas channel openings 42 is controlled with a certain flow rate so that the unwanted powders 105 generated by using the lasers 104 to melt the powders 102 or other material (such as overheated gas, plasma material, and the powders are not melted but ascend on the processing plate 3) can be recycled through one of the gas channel openings 42 and filtered by an air filter.

Referring to FIG. 7 with reference to FIGS. 4 to 6, in the removing step S207, a movement position of the tool 106 is controlled by the material removal mechanism 6 so that the tool 106 cut material on the surface of the workpiece 101. Furthermore, the tool shaft 61 is moved up/down vertically and moved along a plane trough driving a horizontal movement base 62 and a lifting base 63. At the same time, the tool 106 is also rotated or vibrated along an axis by a tool shaft 61 of the material removal mechanism 6 to cut the laminated powders on the surface of the workpiece 101. In the embodiment, the horizontal movement base 62 and the lifting base 63 can provide movement along an X axis, a Y axis, and a Z axis to move the tool shaft 61, wherein the direction of the movement can be controlled through the computer or numerical controller, and the tool shaft 61 is rotated or vibrated along the axis with high-frequency vibration (15~45 kHz) to cut material on the surface of the workpiece 101.

Referring to FIG. 7 with reference to FIGS. 4 to 6, in the completion determining step S208, the two dropping stands 22 of the rolling mechanism 2 are lowered a height to determine whether the workpiece 101 is completed, wherein the workpiece 101 is removed if the workpiece is completed, or the powder feeding step S202 is re-executed if the workpiece is not completed until the cylindrical or cone workpiece 101 is completed, wherein the workpiece has a component or components.

As described above, the rolling type 3D printing device of the present disclosure can provide a laminated manufacture of a cylindrical or cone workpiece 101. Laser sources 31 is disposed within a predetermined plane and configured to emit energy to the surface of the cylindrical or cone workpiece 101. The powders 102 can be fed by the powder conveying module 4 to process the laminated manufacture so that the cylindrical or cone workpiece 101 can be laminated by the powders 102 of a predetermined material in a designated area, and the thickness and predetermined size of the workpiece 101 can be generated (as shown in FIGS. 2 and 3).

In addition, the rolling type 3D printing device can feed the powders, flatten the powders, melt the powders, and inhale the unwanted powders within the predetermined plane, and cannot be limited by the limitation that the working range of f-theta lens is limited, and the workpiece must be flat to be laminated. Therefore, the rolling type 3D printing device can laminate the cylindrical or cone workpiece 101 so that the work efficiency can be improved. The workpiece 101 with an irregular surface, such as cylindrical or cone, can be laminated effectively, the speed limitation that the gas flowing field cannot inhale the unwanted powders 105 for a long time can be reduced, and the lamination time of the workpiece 101 can be reduced.

Furthermore, the speed limitation that the gas flowing field cannot inhale the unwanted powders for a long time can be reduced by using the powder conveying module 4 so that the problem that the unwanted powders cannot be removed can be avoided. Thus, the speed of production process of 3D printed workpieces can be increased, the waiting time in the production process can be reduced, and the process stability can be improved to ensure the quality of the workpiece.

The present disclosure has been described with preferred embodiments thereof and it is understood that many changes and modifications to the described embodiments can be carried out without departing from the scope and the spirit of the invention that is intended to be limited only by the appended claims.

What is claimed is:

1. A 3D printing device, comprising:
   a rolling mechanism configured to hold a workpiece, receive powders, and drive the workpiece to rotate along an axis;
   at least one optical module including laser sources which is disposed above the rolling mechanism and configured to emit lasers to the powders; and
   a powder conveying module including:
   at least one powder channel disposed above the rolling mechanism;
   at least one powder channel opening formed on an outputting end of the powder channel and configured to dispense the powders to the workpiece;
   two gas channels disposed above the rolling mechanism; and
   two gas channel openings separately formed on a first end of the gas channels, and located at two sides of the lasers, respectively, wherein one of the gas channel openings is configured to feed a gas above the workpiece, and the other of the gas channel openings is configured to inhale the gas and unwanted powders generated by using the lasers to melt the powders on the workpiece, wherein a gas flowing field is formed between the two gas channel openings.

2. The 3D printing device according to claim 1, wherein the rolling mechanism comprises two rotary shafts assembled at two sides of the workpiece, respectively.

3. The 3D printing device according to claim 2, wherein the rolling mechanism further comprises two dropping stands, the rotary shafts are disposed on the dropping stands, respectively, and the dropping stands are configured to drive the rotary shafts to move up or down, respectively.

4. The 3D printing device according to claim 1, wherein the powder conveying module further comprises at least one scraper disposed on a surface of one of the gas channels and configured to touch the workpiece.

5. The 3D printing device according to claim 1, further comprising: a powder recovery tank, wherein the rolling mechanism is disposed within the powder recovery tank; and the workpiece is located at a top gap of the powder recovery tank.

6. The 3D printing device according to claim 1, further comprising: a material removal mechanism disposed at a side of the rolling mechanism, wherein the material removal mechanism includes a tool shaft configured to assemble tools to cut the workpiece.

7. The 3D printing device according to claim 6, wherein the material removal mechanism further includes a horizontal movement base and a lifting base; the lifting base is configured to drive the horizontal movement base to move up or down, and the horizontal movement base is configured to drive the tool shaft to move along a plane.

8. An operation method of a 3D printing device, comprising:
- a powder feeding step of feeding an amount of powders to at least one powder channel through at least one powder feeding tank so that the powders are dispensed to a surface of a workpiece through a powder channel opening;
- an adjusting step of adjusting a height of two sides of the workpiece, respectively through using two dropping stands of a rolling mechanism;
- a powder flattening step of driving two rotary shafts of the rolling mechanism to rotate the workpiece and flattening the powders on the workpiece by at least one scraper;
- a fusing step of moving laser sources so that lasers emitted by the laser sources melts the powders flattened on the workpiece for laminating the powders on the workpiece;
- a powder recycling step of inhaling unwanted powders generated by using the lasers to melt and laminate the powders on the workpiece through forming a gas flowing field defined between two gas channel openings located at two sides of the lasers when the lasers melts the powders on the workpiece;
- a removing step of controlling a moving position of a tool by using a material removal mechanism so that the tool is driven to cut the laminated powders on the surface of the workpiece; and
- a completion determining step of lowering a height of the two dropping stands of the rolling mechanism and determining whether the workpiece is completed, wherein the workpiece is moved out of the 3D printing device if the workpiece is completed, or the powder feeding step is re-executed if the workpiece is not completed.

9. The operation method of the 3D printing device according to claim 8, wherein the operation method further comprises a positioning step before the powder feeding step, and the positioning step is configured to move the two dropping stands of the rolling mechanism so that the workpiece is moved to a predetermined position.

10. The operation method of the 3D printing device according to claim 8, wherein in the removing step, the tool is moved up or down by a lifting base of the material removal mechanism, and moved along a plane by a horizontal movement base of the material removal mechanism; and wherein the tool is also rotated or vibrated along an axis by a tool shaft of the material removal mechanism to cut the laminated powders on the surface of the workpiece.

* * * * *